US007890327B2

(12) United States Patent
Dorai et al.

(10) Patent No.: US 7,890,327 B2
(45) Date of Patent: Feb. 15, 2011

(54) FRAMEWORK FOR EXTRACTING MULTIPLE-RESOLUTION SEMANTICS IN COMPOSITE MEDIA CONTENT ANALYSIS

(75) Inventors: Chitra Dorai, Chappaqua, NY (US); Ying Li, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1134 days.

(21) Appl. No.: 10/892,637

(22) Filed: Jul. 16, 2004

(65) Prior Publication Data

US 2005/0286865 A1 Dec. 29, 2005

Related U.S. Application Data

(60) Provisional application No. 60/583,394, filed on Jun. 28, 2004.

(51) Int. Cl.
G10L 15/14 (2006.01)
G10L 15/06 (2006.01)
G10L 15/00 (2006.01)
(52) U.S. Cl. .................. 704/256; 704/245; 704/270
(58) Field of Classification Search .................. 704/248
See application file for complete search history.

(56) References Cited

PUBLICATIONS

Haubold et al, "Segmentation, Indexing, and Visualization of Extended Instructional Videos", Feb 16, 2003, <http://arxiv.org/abs/cs.IR/0302023>.*

Dorai et al, "ELM-N: E-Learning Media Navigator", 2001, Proceedings of 9th ACM Conference on Multimedia, p. 634-635.*
Zhang et al, "BIRCH: A New Data Clustering Algorithm and Its Applications", 1997, Kluwer Academic Publishers, p. 141-182.*
Wang et al, "Multimedia content Analysis", Nov. 2000, IEEE Signal Processing Machine, p. 12-36.*
Hanjalic et al, "An Integrated Scheme for Automated Video Abstraction Based on Unsepervised Cluster-Validity Analysis", 1999, IEEE, p. 1280-1289.*
Phung et al, "Narrative structure Analysis with Education and Training videos for E-Learning" , 2002, IEEE, p. 835-838.*
Onishi et al, "Blackboard Segmentation Using Video Image of Lecture and its Application", 2000, 15th ICPR proceedings, p. 615-618.*

(Continued)

*Primary Examiner*—Richemond Dorvil
*Assistant Examiner*—Olujimi A Adesanya
(74) *Attorney, Agent, or Firm*—F. Chau & Associates, LLC

(57) ABSTRACT

Disclosed is a general framework for extracting semantics from composite media content at various resolutions. Specifically, given a media stream, which may consist of various types of media modalities including audio, visual, text and graphics information, the disclosed framework describes how various types of semantics could be extracted at different levels by exploiting and integrating different media features. The output of this framework is a series of tagged (or annotated) media segments at different scales. Specifically, at the lowest resolution, the media segments are characterized in a more general and broader sense, thus they are identified at a larger scale; while at the highest resolution, the media content is more specifically analyzed, inspected and identified, which thus results in small-scaled media segments.

9 Claims, 10 Drawing Sheets

OTHER PUBLICATIONS

Liu et al, "semantic Mosaic for Indexing and Compresssing Instructional Videos", ICIP, 2003.*

Girgensohn et al, "Keyframe Based User Interface for Digital Video", Sep. 2001, IEEE, vol. 34, p. 61-67.*

Wilcox et al, "Annotation and Segmentation for Multimedia Indexing and Retrieval", 1998, IEEE, vol. 2.*

Li et al, "Content-Based Movie Analysis and Indexing Based on AudioVisual Cues", Jun. 11, 2003, Universiy of Southern California, pp. 1-31.*

Li et al, "Unsupervised Real-Time Speaker Identfication for Daily Movies", 2002, Proc. of SPIE, pp. 151-162.*

Li et al, "Content Based Movie Analysis and Indexing Based on audioVisual Cues", Jun. 11, 2003, University of Southern California, <http://sail.usc.edu/publications/Csvt_Kuo.pdf>, pp. 1-31.*

Kuo et al, "Unsupervised Speaker Identification for Movie Content Analysis", University of Southern California, <imsc.usc.edu/research/project/sceneextract/multimedia_summ_tech.pdf>, pp. 1-2.*

Li, Movie Content Analysis, Indexing and Skimming via Multi Modal Information. Video Mining, chapter 5, eds. Kluwer Academic Publishers, Jun. 30 2003, pp. 1-32.*

Yeung et al, "Extracting Story Units from Long Programs for Video Browsing and Navigation", 1996, In Proc. IEEE Multimedia Computing and Systems, pp. 296-305.*

Li et al, "Content-Based Movie Analysis and Indexing Based on AudioVisual Cues", Aug. 2004, In Proc IEEE Transactions on Circuits and Systems for Video Technology, vol. 14, No. 8, pp. 1073-1085.*

Alatan et al, "Multi-Modal Dialog Scene Detection Using Hidden markov Models for Content-Based Multimedia Indexing", 2001, Multimedia Tools and Applications, vol. 14, No. 2, pp. 137-151.*

Ying Li, et al. "A Robust Video Scene Extraction Approach to Movie Content Abstraction," International Journal of Imaging Systems and Technology, vol. 13, Issue 5, pp. 236-244, Mar. 10, 2004.

Ying Li, et al. "Automatic Movie Index Generation Based on Multimodal Information," Proceedings SPIE, vol. 4519, 42 (2001), Apr. 28, 2003.

Ying Li, et al. "Identification of Speakers in Movie Dialogs Using Audiovisual Cues," Acoustics, Speech, and Signal Processing, 2002, Proceedings (ICASSP '02). IEEE International Conference, vol. 2, pp. 2093-2096, May 2002.

* cited by examiner

Data partition from
k (k = 1... L) clustering passes,
$P_k = \{C_1, ..., C_k\}$

Compute 7 measurements for each pass: 1 intra-cluster distance, 3 inter-cluster distances, and 3 inter-MDPA distances — 901

Compute the clustering validity index VI (k, k+1) for each neighboring pass pair (k, k+1) — 903

Denote the pass k' which corresponds to the first local maximum in VI curve as the optimal pass — 905

Output partition $P_{k'}$ as the final clustering result

Figure 9

FRAMEWORK FOR EXTRACTING MULTIPLE-RESOLUTION SEMANTICS IN COMPOSITE MEDIA CONTENT ANALYSIS

The present Application claims priority to the following provisional application: U.S. Provisional Patent Application No. 60/583,394, filed on Jun. 28, 2004, to Dorai et al.

FIELD OF THE INVENTION

The present invention is directed to the field of multimedia content analysis. It is more particularly directed to providing a framework that facilitates efficient media content access, indexing, browsing and retrieval of multiple-resolution semantics as part of a composite media content analysis.

BACKGROUND OF THE INVENTION

Due to decreasing costs of storage devices, higher data transmission rates, and improved data compression techniques, digital multimedia content is accumulating at an ever increasing rate. Because of the content's bulky data volume and unstructured data format, access to multimedia content remains inefficient to this day.

For example, although it may be misconceived as an easy task, processing multimedia content based on the perception of various information sources such as audio, video and text present in the content, efficient access to multimedia content continues to be a very complicated process for a computer to emulate. The reasons relate to limitations of machine analysis of multimedia under unconstrained environments and due to the unstructured nature of the media data. For instance, most of the current digital video players can only provide basic functions such as fast forward, rewind, pause and stop for a linear content search. Very few of them could support non-linear access such as random seek based on the content in the video.

While a DVD player allows users to jump to a particular access point such as a scene or a chapter, most of the indexing information that facilitates that jump is either content-blind or manually generated. That approach is obviously labor-intensive and becomes impractical for a large multimedia collection. Therefore, there is a need in the art for a comprehensive multimedia analysis system that automatically extracts content semantics at multiple and different resolutions to facilitate efficient content access, indexing, browsing and retrieval.

SUMMARY AND OBJECTS OF THE INVENTION

The present invention presents a comprehensive framework for extracting multiple-resolution semantics in composite media content analysis. A hierarchical content analysis tree is provided to analyze the media content and to extract its semantics at different scales depending on the analysis stages. Various media features, be it audio, visual or text, may be employed and integrated to achieve the analysis task and the interpretation at each level. Further, the framework of the present invention is general enough to cover composite media streams, which may include multiple media modalities such as audio, visual, embedded text, presentation, and graphics.

It is thus a first object of the present invention to provide a general software framework for extracting semantics from composite media content at various resolutions.

It is another object of the present invention to provide detailed architectures of such a framework in the scenario of content management as applied to electronic learning ("eLearning").

These and other objects, features, and advantages of the present invention will become apparent upon further consideration of the following detailed description of the invention when read in conjunction with the figures.

BRIEF DESCRIPTION OF THE DRAWINGS

FIG. 9 illustrates a flowchart of the cluster validity analysis; and

DETAILED DESCRIPTION OF THE INVENTION

Overview of the Framework for Learning Media Content Analysis

Figure 1:
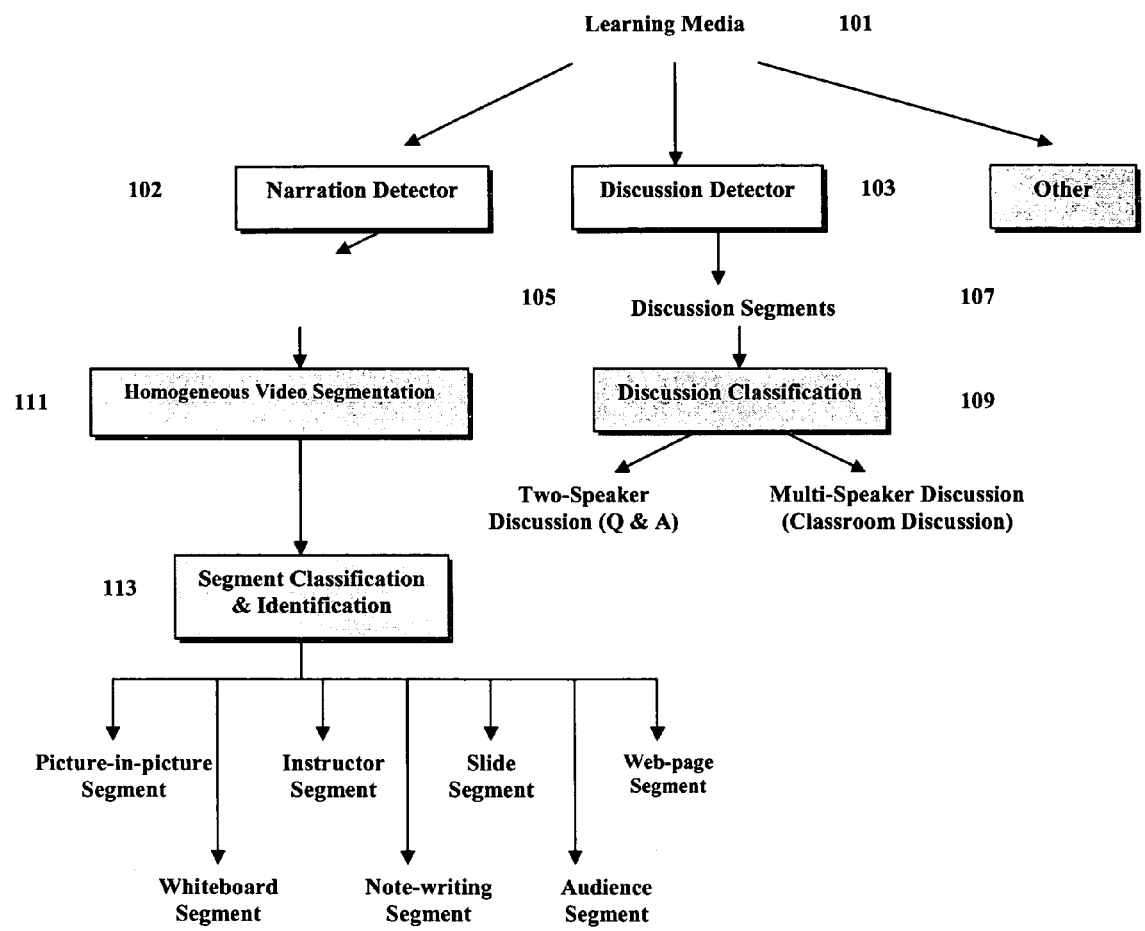
FIG. 1 illustrates a hierarchical framework for learning media content analysis.

FIG. 1 illustrates a hierarchical framework view for extracting semantics from e-learning media content of the present invention. A hierarchical framework may be defined as a conceptual diagram of a computational process or a flow from beginning to end which can be described using a tree-like structure with branches and nodes, where branches represent possible flow paths and the nodes represent different destinations. A hierarchical framework may be implemented as a series of steps, where at each step there is a decision-making process that determines the next possible step among available choices based on certain criteria. Typically, it can be described as a method of flowchart.

The term "semantics" may be defined as meanings or associated knowledge that is inferred by humans watching the media. For example, in a lecture video, appropriate semantics such as "teacher teaching or lecturing" can be assigned to a segment where a teacher is seen teaching in a monolog. The semantics can help annotate content in a way that allows a video viewer to selectively jump to all segments that convey these same semantics.

In the illustrated embodiment, given learning media 101, a narration detector 102 finds all narration segments 105, a discussion detector 103 finds all discussion segments 107, and other detectors may find other types of segments such as music, environmental sound, silence and demonstration. This embodiment mainly focuses on the narration and discussion parts. An example of learning media 101 may be an instructional video, be it educational or for training. Additional examples may include seminar videos, classroom lectures, safety training videos, etc. The discussion segments may be defined as those segments in the media where the audience or students interact with the speaker or instructor, asking questions and making comments. These are different from the narration segments where the speaker/instructor gives a fairly uninterrupted speech, lecture or presentation.

The discussion segments 107 may be further classified as discussions that only contain two participants and those with multiple ones (module 109). A typical question and answer scene is of the two-speaker discussion type, while a presentation or lecture in a controversial or important topic may lead to an energetic classroom discussion involving multiple people.

Discovering a learning video's narration and discussion distribution patterns, as well as revealing the discussion flows within each discussion, can reflect the classroom dynamics and instructor styles to a certain extent. That also helps in evaluating a teacher's classroom effectiveness in a consistent and unbiased manner as opposed to subjective evaluations by student surveys.

The homogeneous video segmentation module 111 at the same time, divides the narration segments 105 into homogeneous video segments. A homogeneous segment may be defined as a segment containing the same type of video frames such as slides, web-pages and whiteboard. A frame may be defined as an image within the image sequence that constitutes the video.

Subsequent to the video segmentation, all homogeneous segments may be categorized into the following seven classes in the module 113: picture-in-picture, instructor, slide, web page, whiteboard, note-writing and audience, to further understand the media content. Frames in the picture-in-picture segment may contain an inset sub-picture which shows an independent image which may have the same or a different content from the surrounding frame. For example, when an instructor launches a media player to play back a video during the lecture, the picture-in-picture feature (or video-in-video if the timeline is taken into consideration) may be used. The instructor segment, as the name implies, may contain a close-up to mid-range shot of the instructor or speaker in its frames.

Frames in the audience, slide, web page, whiteboard and note-writing segments may respectively contain people, presentation slides, web content, image of the whiteboard as the instructor writes additional materials on the board, and handwritten images of the class notes which are usually seen, for example, in classroom lectures at universities. Any segments that do not fall into any of the aforementioned seven classes may be denoted as miscellaneous.

Various media features, algorithms and tools may be applied in modules 111 and 113 to achieve the analysis goal.

Narration and Discussion Segment Detection

Figure 2:
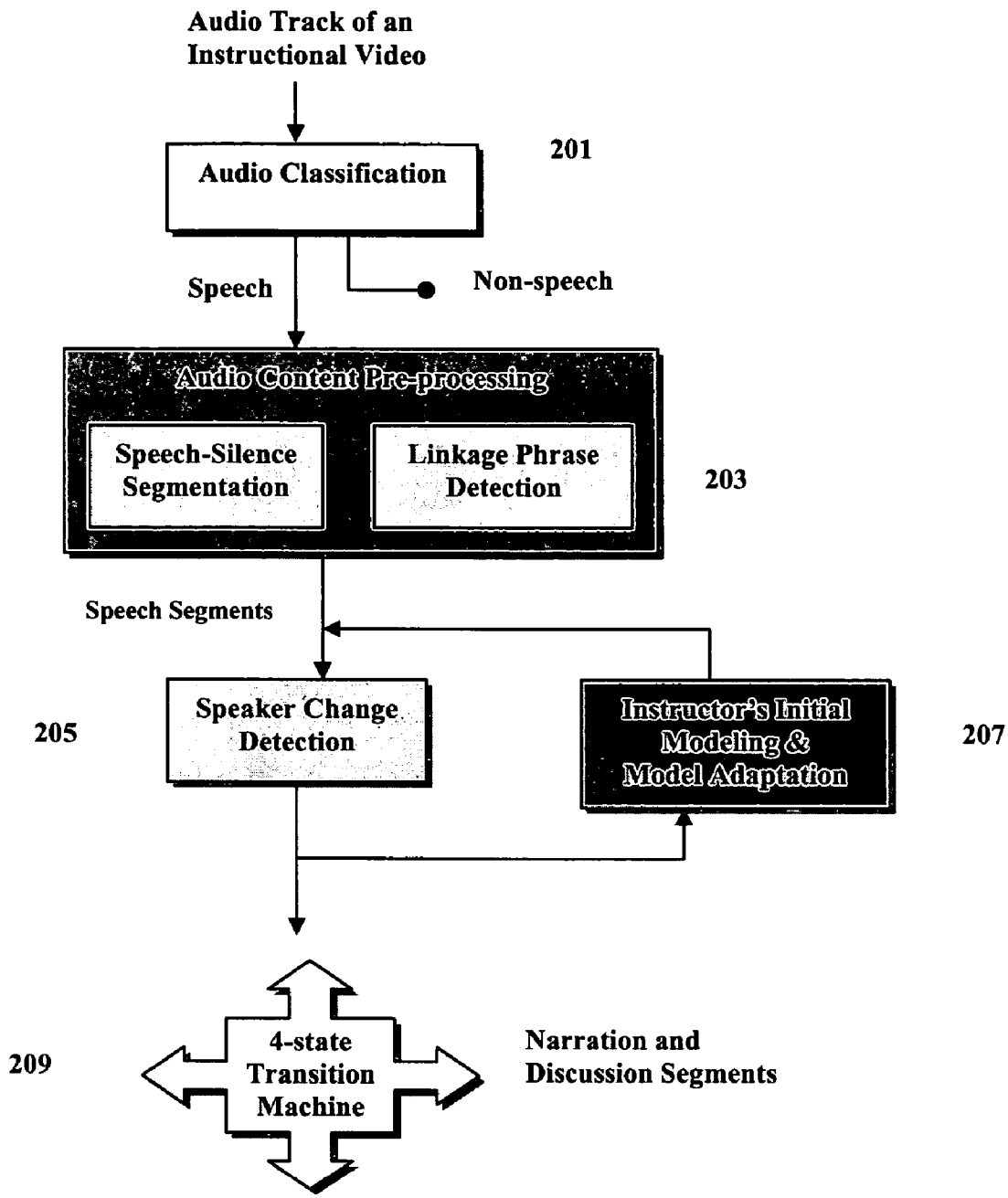
FIG. 2 illustrates a framework of the narration and discussion segment detection.

FIG. 2 shows the framework of detecting narration and discussion segments in instructional videos (modules 102 and 103 in FIG. 1). Specifically, module 201 receives the audio track of an instructional video as input and applies an audio classification scheme to it. The output of the audio classification module 201 is recognized speech signals. All other types of signals may be discarded at this step.

Module 203 includes pre-processing audio content to separate the speech signals from the background silence/noise; to obtain segments that contain only speech; and to remove linkage phrases that are defined as speech patterns people use to connect words and sentences in a continuous speech mode, e.g. "um", "ah", "huh", etc. Module 205 may include the comparison of incoming speech segments with the instructor's statistical speech model by measuring the acoustic dissimilarity between the model and the received speech segments, and detecting possible speaker change points. In module 207, the instructor's model may be updated based on the comparison results. Module 209 includes the use of a four-state transition machine to track the speech flow and extract both narration and discussion segments. A state transition machine is defined as a system with discrete inputs and outputs, which shows the state space of a given context (e.g. speech context), the events that cause a transition from one state to another, and the actions that result. The state transition machine used in Module 209 has four states.

In the illustrated embodiment, the narration and discussion detectors are implemented in the same framework. Nevertheless, separate detectors may be applied appropriately.

In an embodiment, a signal-bearing medium tangibly embodying a program of machine-readable instructions executable by a digital processing apparatus performs a method for content analysis. The method comprises receiving composite media content, identifying at least one segment starting point as associated with discussion, narration, or other content, based on a classification scheme, and annotating the at least one segment according to the classification if the at least one segment is associated with either narration or discussion.

Homogeneous Video Segmentation

Figure 3:
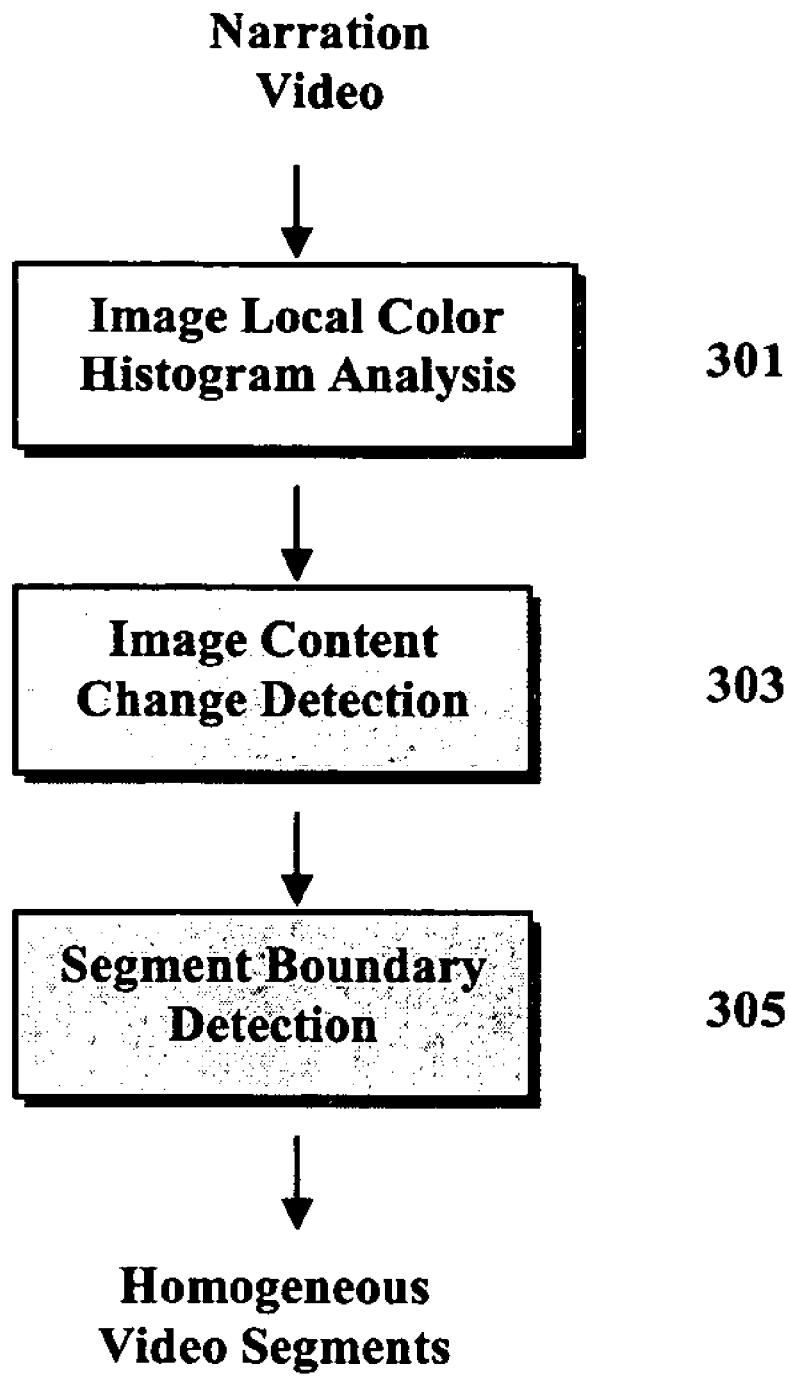
FIG. 3 illustrates a flowchart of the homogeneous video segmentation.

FIG. 3 shows the flowchart of performing the homogeneous video segmentation (module 111 in FIG. 1). Specifically, given the narration part of the video 105, the local color histogram is first analyzed for each frame in module 301. Then in module 303, for each pair of neighboring frames (for example, f1 and f2), their image content is compared based on their local histogram information. A goal of this comparison is to discover any major content changes occurred between f1 and f2, while at the same time, neglect any minor changes that may be caused by digitization noise, jerky camera motion and illumination changes. Finally, module 305 finds the boundaries between homogeneous segments using the content change information obtained from module 303. In particular, to achieve a robust detection result, a "bi-directional boundary searching" process may be used, which ensures that distinct content change occurs in both the "left-to-right" and "right-to-left" directions across the segment boundary.

Segment Classification and Identification

Figure 4:
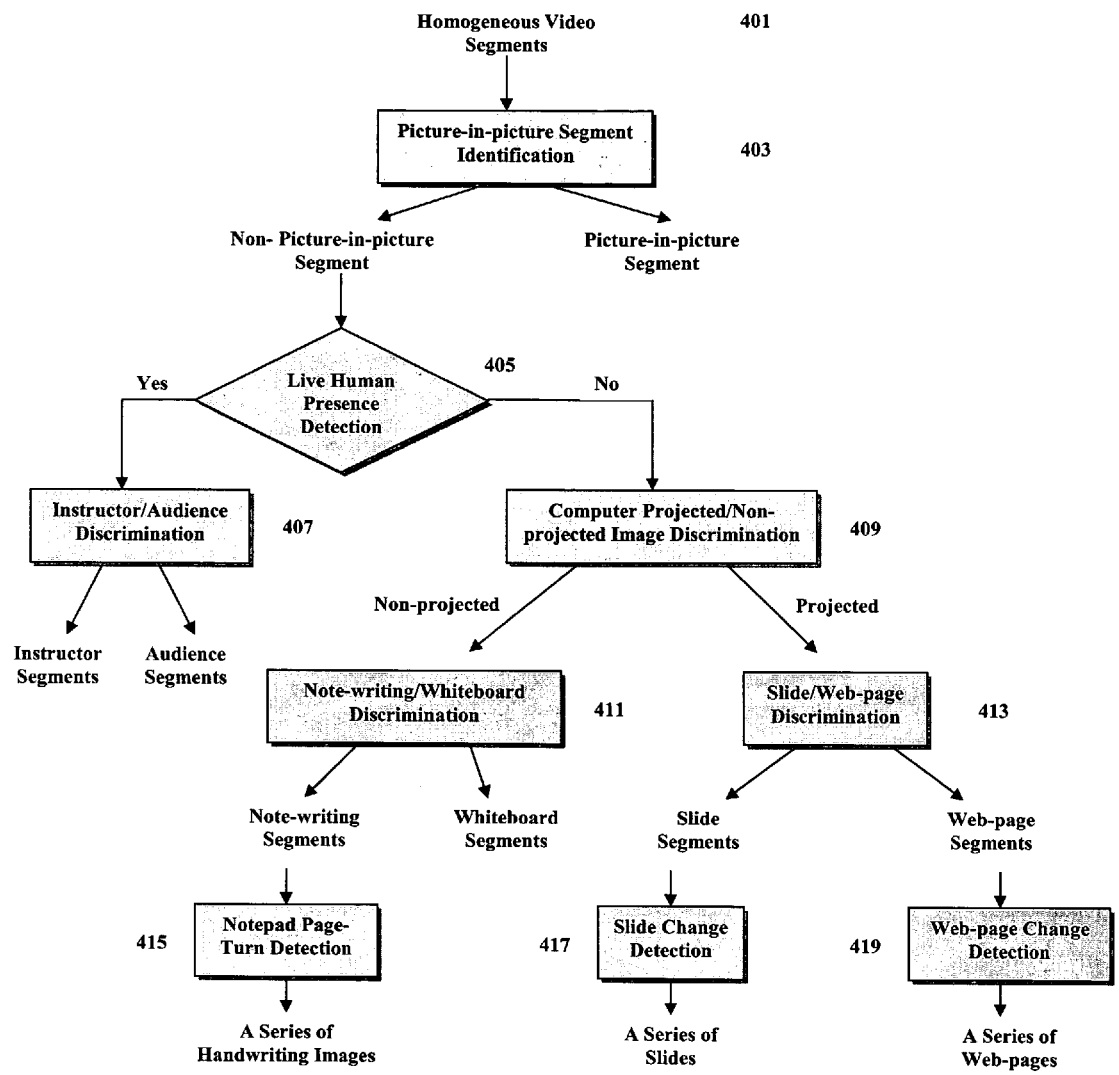
FIG. 4 illustrates a flowchart of the segment classification and identification.

Classification of a segment may be defined as assigning the segment to one of the pre-defined categories of information. Identification is attaching a label or a tag to the segment. FIG. 4 shows one example of decomposing video content in a hierarchical manner which implements the module 113 in FIG. 1. Specifically, given a homogeneous video segment 401, module 403 first determines if it is a picture-in-picture segment. The following two criteria are used for this purpose: 1) the picture-in-picture segment generally presents a larger content variation; and 2) the aforementioned content change may be confined to a local image area.

For a non-picture-in-picture segment, it is checked if humans are present in the scene in module 405. A human face detection technique may be used to achieve this goal as a person of ordinary skill in the art would appreciate. If humans are detected to be present, module 407 further determines if it only contains the instructor, or it is a shot of audience. The face detection results as well as the color layout information may be used to fulfill this task.

If there is no human present in a current segment, module 409 discriminates computer-projected images from non-computer-projected images. The luminance and chrominance information may be used to achieve this task.

For a non-computer-projected segment, which may contain either note-writing or whiteboard images, module 411 discriminates them from one another. The color as well as background layout information may be used for this task. By contrast, if the segment does contain computer-projected images, then module 413 is applied to distinguish slide images from web-pages. The detection of slide title, slide design template, the text layout as well font size and color may be used in this process.

Finally, for the detected note-writing segment, we may further apply a notepad page-turn detection process may be applied (module 415) to locate the point where the instructor starts a new page. A series of handwriting images are subsequently obtained where each image corresponds to the page right before a new page is started. Similarly, modules 417 and 419 detect the boundary where a transition occurs from one slide (or one web-page) to another. The series of slides or web-pages achieved from these two modules preferably contain distinct slides or web-pages, and may be used for content annotation purpose.

FIG. 4 illustrates one embodiment for performing the content decomposition. A person of ordinary skill in the art would recognize that the decomposition approach could also be accomplished in various other ways.

Discussion Scene Classification

Figure 5:
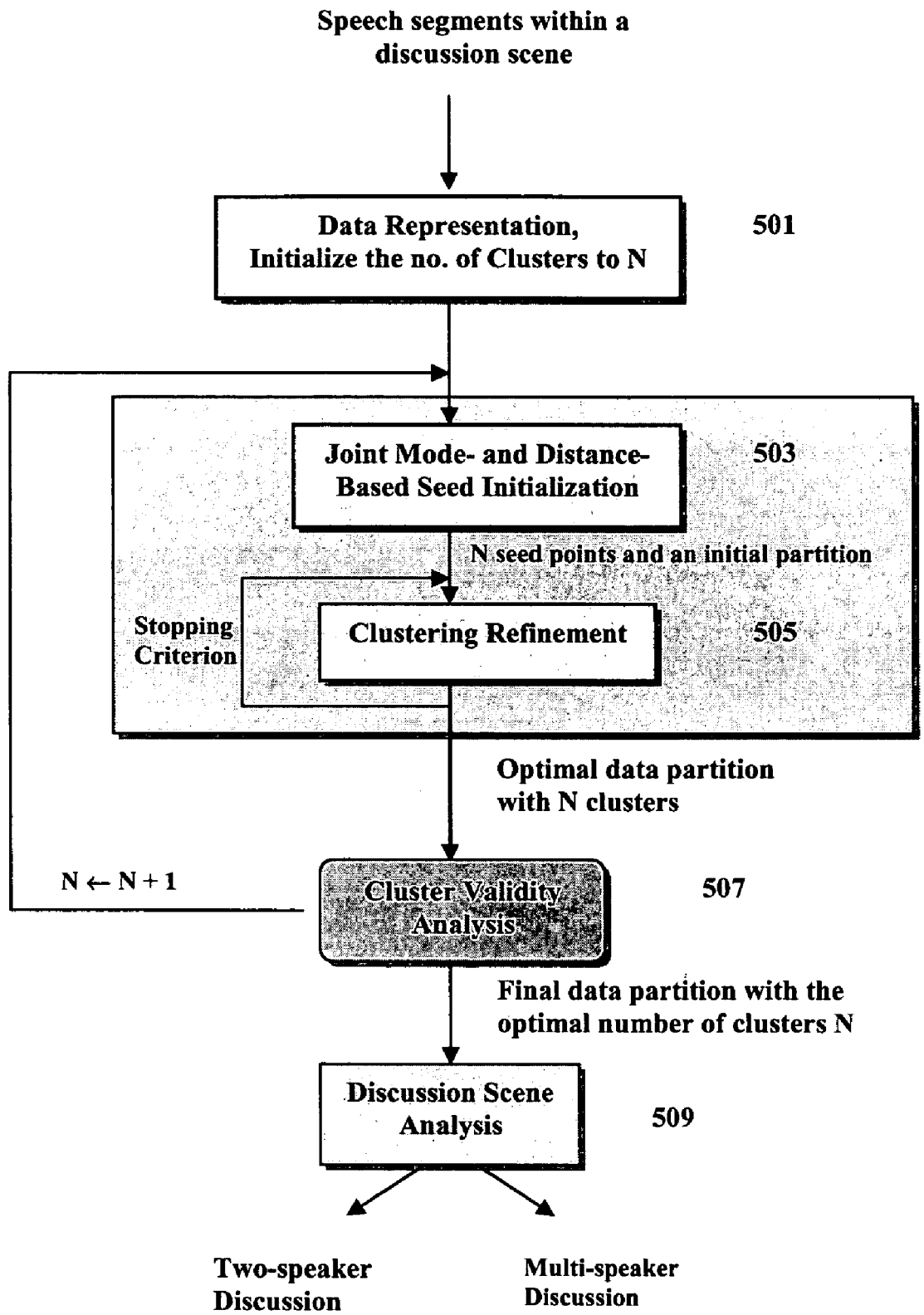
FIG. 5 illustrates a flowchart of the discussion scene classification framework.

FIG. 5 shows an exemplary implementation of the classification module 109 in FIG. 1. In FIG. 5, module 109 is provided with a discussion scene extracted from the discussion segment detection scheme described in FIG. 2. Module 501 is applied to represent the speech segments in the LSP (Line-Spectrum Pair) feature space, and to establish the segments' associations or proximity using the K-L (Kullback-Leibler) distance metric. A person of ordinary skill in the art would know how to represent speech segments in LSP and how to calculate proximities using the K-L metric.

Module 503 may use a joint-mode and distance-based approach to find a set of seeds to initiate a clustering process. Specific data clustering approaches are discussed in the next section.

In module 505, a clustering refinement is carried out to adjust the cluster for each speech segments in the LSP space based on the evaluation of a distance measurement. To find the best data partition with an optimal cluster number, Module 507 may be applied to perform a cluster validity analysis to evaluate various clustering results obtained by using different number of clusters. It then chooses the cluster that satisfies certain validation criteria as discussed in the next section. Module 509 identifies the discussion type based on the final clustering results. Particularly, if the scene only contains two clusters, it is a two-speaker discussion; otherwise, it involves multiple speakers.

DATA CLUSTERING APPROACH FOR DISCUSSION SCENES CLASSIFICATION

Approach Overview

A speech segment is also referred to herein as a data point or pattern in the feature space. One embodiment of the clustering approach of the present invention groups a collection of data points into natural clusters according to the distribution patterns of the data. Referring back to FIG. 5, the four major steps involved in this process may be summarized as data representation (module 501), cluster seed initialization (module 503), clustering refinement (module 505), and cluster validity analysis (module 507).

The data representation stage represents each data point by its feature vector, computes their pairwise distances and constructs a proximity matrix. A proximity matrix may be defined as an n×n matrix (n is the number of data points), where the value of each entry (i,j) equals the pairwise distance between points i and j. In addition, this first step includes the initialization of the number of desired clusters to N, which could be any number at this stage. Typically N can vary from 1 to the total number of data points.

In the second stage, N seed points are located and an initial data partition is generated using a joint mode- and distance-based seed initialization method. A clustering refinement process is then carried out in the third step, which iteratively adjusts the points' cluster memberships based on their point stability values (PSV). A PSV may be defined as a measurement that reveals the stability of a point to remain in its current cluster. The refinement process stops when a certain optimization criterion is met.

In the fourth major step, a cluster validity analysis is performed to validate the clustering results for the given data distribution by evaluating a validity index. Based on the validation result, the method either performs another round of clustering process with an increased N, or sets the current data partition as the final result and output the current N as the optimal number of clusters.

Mode-Based Data Clustering: Data Representation

To determine the "similarity" between data points, each point may first be represented as a feature vector in a pre-defined feature space. A feature space may be defined as a space containing vectors of measurements that describe each point. The next step computes the vectors' pairwise distances using a certain distance metric. The present application denotes the distance between points i and j as dist (i, j). While the feature representation could be greatly dependent on specific applications, some commonly used distance metrics to compare the points include the Euclidean distance, Mahalanobis distance, and Bhattacharyya distance.

Mode-Based Data Clustering: Joint Mode- and Distance-Based Seed Initialization

Figure 6:
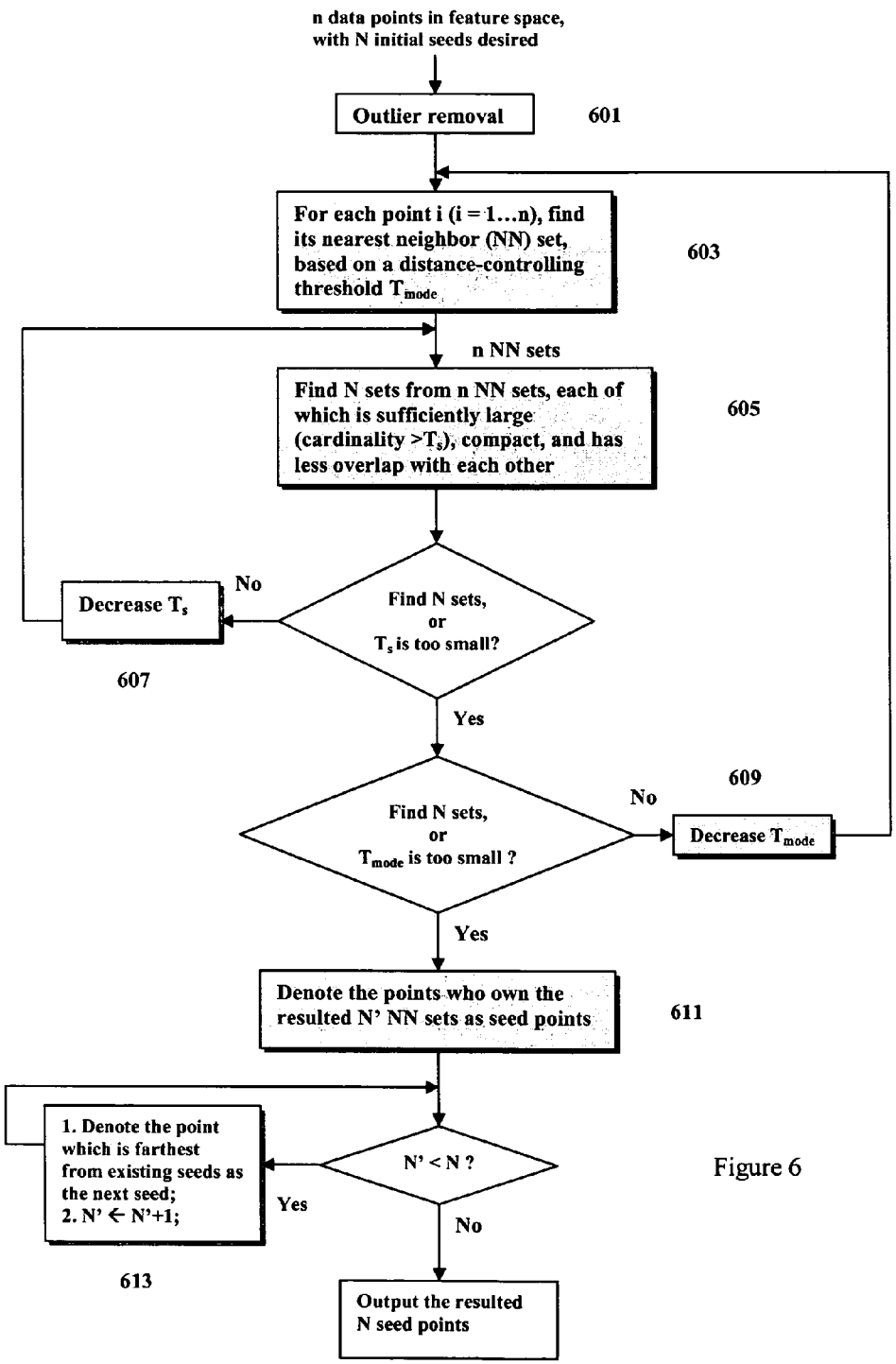
FIG. 6 illustrates a flowchart of the joint mode- and distance-based seed initialization process.

FIG. 6 shows an exemplary implementation of the seed initialization module 503 in FIG. 5, which finds N meaningful seed points to initialize the cluster search algorithm. One embodiment of this step first removes the outliers, then uses a joint mode seeking and distance-based approach to locate seed points and form the initial data partition.

Outlier Removal

When a data point is sufficiently far from the rest of data, that point may be referred to an outlier. Outliers are usually caused by noisy data, e.g., speech with a lot of background noise. Because outliers can severely affect the accuracy of the clustering process, a desirable first step in clustering analysis is to remove such outliers.

A simple scheme may be designed to detect outliers based on a threshold in module 601. For example, as long as the distances between point A and all other points are larger than a certain threshold, point A is identified as an outlier and is removed from the data set.

Adaptive Mode Seeking

Clusters can be viewed as densely populated regions in the feature space, separated by regions of low data density. Naturally, clusters may be identified by searching for regions of high density. Such regions of high density may be referred to as modes. One aspect of the present invention involves finding N modes for a given data distribution using an adaptive mode seeking approach.

Assuming a total of n data points in consideration, four major steps for the mode seeking process may be implemented as follows:

Step 1: For each point i, find its nearest neighbors (NN) and group them into set $\Phi_i$ (module 603). This can be performed by searching for a point j where:

(1), j=arg min{dist(m,φ$_i$)}, m=1, ... n, m∉φ$_i$. The function dist (m, Φ$_j$) may be defined as the distance from point m to set Φ$_j$, which may be defined as the median of the distances from point m to all points in Φ$_j$. That is, dist(m, φ$_i$)=median{dist(m,k), k∈φ$_i$}. When Φ$_i$ is empty (i.e., it does not contain any element), dist (m, Φ$_i$) equals dist (m, i).

(2), dist (j, Φ$_i$)<T$_{mode}$. Threshold T$_{mode}$ may be initially set to be a certain value, but it can be automatically adjusted in a later process as needed. When both conditions are satisfied, point j is added into point i's NN set Φ$_i$. To be qualified as point i's NN, point j should also be close to point i's other NNs in Φ$_i$. As a result, point i's NNs are added into Φ$_i$ in a particular order: the closest points get added into Φ$_i$ first. These criteria are stricter than regular NN rules which only require point j to be close to point i. These criteria are particularly applied to ensure that all of i's NNs are close to each other so as to form a compact group. The searching process may be repeated until no more points are qualified.

Step 2: For each NN set Φ$_i$, i=1, ..., n, calculate its intra-set distance d$_i$ by averaging all pairwise distances within it. For convenience, s$_i$ denotes its cardinality. A small distance d$_i$ and a large size s$_i$ implies that point i is in a densely populated area.

Step 3: Find the N sets (define it as a set ensemble DS) from all NN sets obtained from Step 1, which: (1) has a sufficiently large size; (2) is as compact as possible; and (3) is less overlapped with each other (module 605). The goal is to attempt to locate the N regions which are not only densely populated, but are also well isolated from each other. To achieve the goal, the set Φ$_i$, which has the smallest intra-set distance d$_i$ and whose size s$_i$ is larger than T$_s$, is searched. Once it is found, it is added into DS if the overlap between Φ$_i$ and other sets in DS is sufficiently low (based on a threshold T$_o$). Threshold T$_s$ may be initially set to be n/(2*N). Nevertheless, if unable to locate all N sets with its current value, the value may be automatically decreased (module 607). In that case, the entire searching process is re-started until T$_s$ becomes too small. T$_o$ could be heuristically set.

Step 4: If unable to find all N sets from Step 3, even with the adjustment of T$_s$, the threshold T$_{mode}$ may be automatically decreased by a small amount until it becomes smaller than a certain preset value (module 609). Steps 1, 2 and 3 are re-executed after each adjustment of T$_{mode}$. The reason for this adjustment step is that when T$_{mode}$ is too large, points belonging to different clusters become nearest neighbors, thus many NN sets tend to be overlapped with each other. Nevertheless, T$_{mode}$ getting too small results in many small compact data sets, which is also not desirable.

This mode seeking process is somewhat similar to the idea behind Gonzalez's "min-max" rule which partitions n data points into k clusters where the maximum intra-cluster distance is minimized (refer to T. Gonzalez, "Clustering to Minimize the Maximum Inter-cluster Distance", Theoretical Computer Science, vol. 38, pp. 293-306, 1985). In contrast, Gonzalez uses a fixed radius R to find all clusters, which is not flexible enough to find all clusters with various shapes and sizes.

Assuming that N'NN sets have been obtained in the DS after the above four steps, where each set represents one densely populated area, the N' points who own these sets may be denoted as the seed points (module 611). Depending on the data distribution, N' may be less than N, especially when the data contain regions of variable sizes. Very small-sized regions tend to be ignored by this mode-seeking approach if they co-exist with large-sized ones. Existing approaches treat points in these regions as outliers or merge them into others, yet they do not offer an efficient solution for the eLearning application since certain speakers may produce insufficient speech data in this case.

Integration of the Distance-Based Approach

Figure 7:
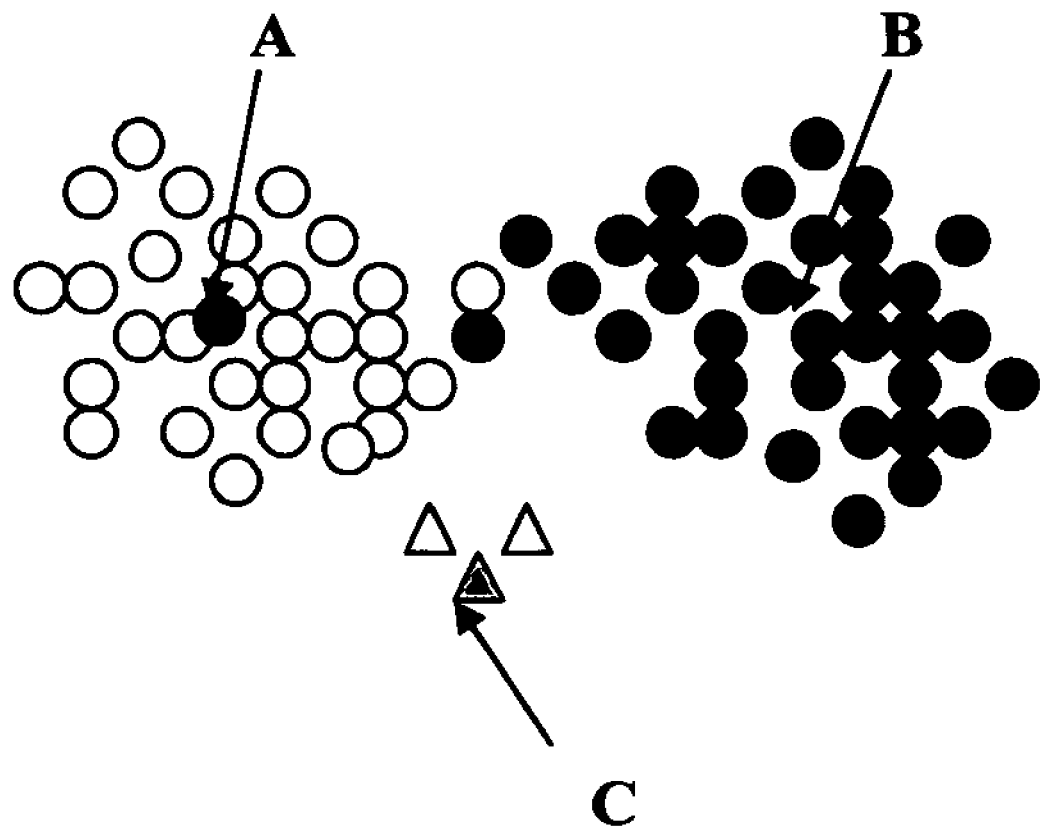
FIG. 7 illustrates a grouping of points into three clusters.

To address the problem of insufficiency of speech data, the present invention integrates a distance-based approach into this clustering process. Specifically, if the number of seeds (N') obtained from the "Adaptive Mode Seeking" process is less than N, then the rest of the seeds (N-N') may be successively identified by finding the point that has the largest average distance from all existing seeds (module 613). FIG. 7 shows one example where points A and B are two seed points identified by the mode seeking approach, while seed C is located with the distance-based method since it is the farthest point from both A and B.

After obtaining the N seed points, the rest of the data points are assigned to their closest seeds. This forms an initial data partition wherein all data points are grouped into N clusters surrounding the seed points. One example is shown in FIG. 7 where a total of 68 points is grouped into 3 clusters. Points A, B and C are the three located seed points. The point assignment may follow the same rules used in finding the nearest neighbors in Step 1 of "Adaptive Mode Seeking" Section. That is, when measuring the distance from point j to seed i, not only is the distance between i and j considered, but also the distance from j to other points that are already assigned to i as well. Moreover, the point which presents the smallest distance to a seed gets assigned to the cluster first that centers on the seed.

Mode-Based Data Clustering: Clustering Refinement and Stopping

Figure 8:
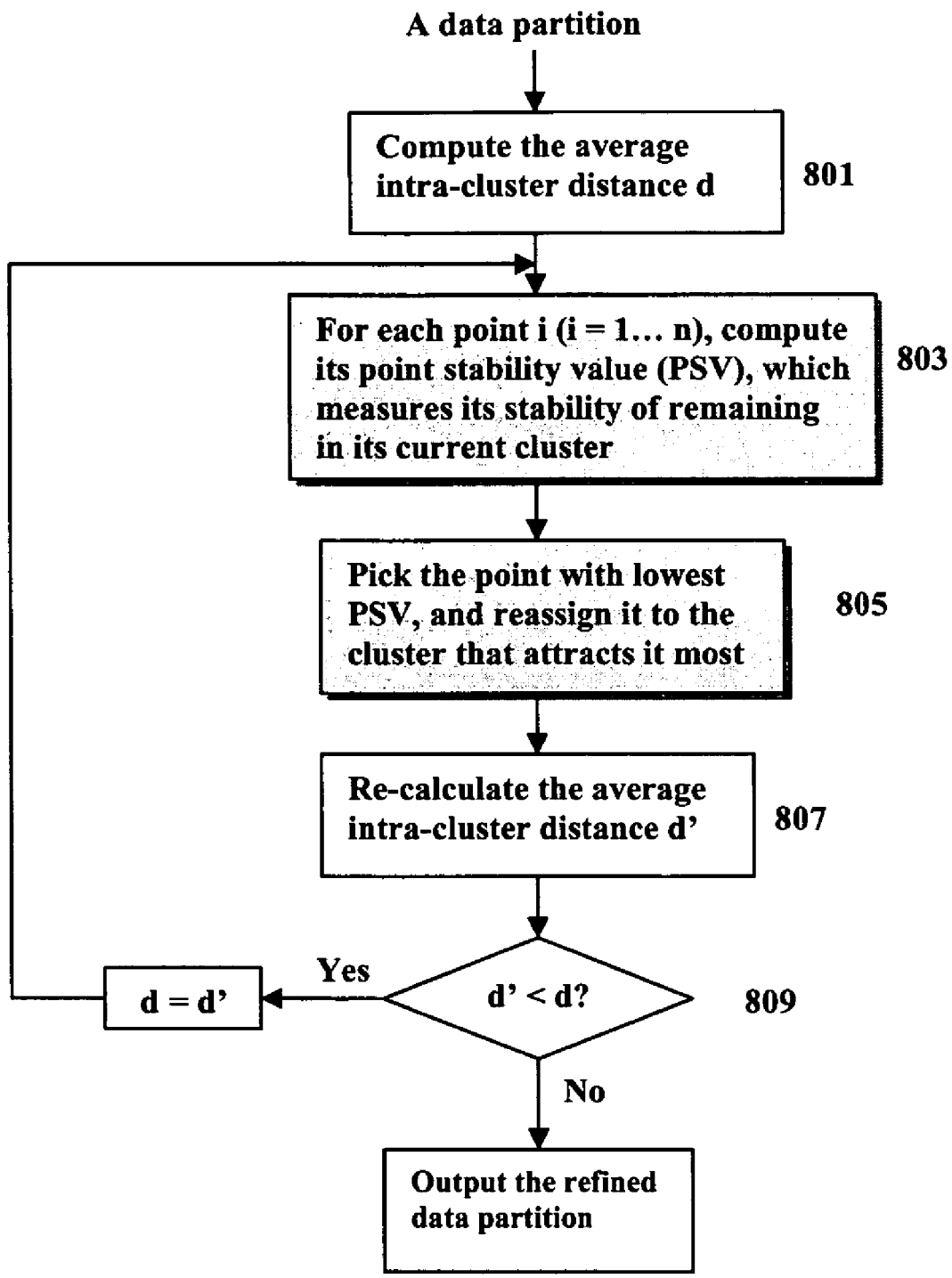
FIG. 8 illustrates a flowchart of the clustering refinement process.

FIG. 8 shows an exemplary implementation of the clustering refinement module 505 in FIG. 5, which may be used in conjunction with any clustering technique in order to refine a data partition. Specifically, this step refines the data partition by adjusting point cluster memberships to minimize the average intra-cluster distance. Four major steps may be involved in this process.

Step 1: For each cluster, calculate its intra-cluster distance by averaging all possible pairwise distances between its data points. Then, the average intra-cluster distance d is obtained by taking the mean of all intra-cluster distances (module 801).

Step 2: For each point i in cluster C, calculate its point stability value (PSV) as $$PSV(i) = 1 - \frac{R(i, C)}{\min_{C' \neq C} R(i, C')}$$

where R (i, C) denotes the repulsion between i and other points in C, while R (i, C') denotes the repulsion between i and cluster C' (C'<>C) (module 803). Repulsion may be defined as the dissimilarity between two points. R (i, C) may be calculated as R(i,C)=median{dist(i,j), j≠i, j∈C}, but any other reasonable measurement could also apply as described in the following citation: A. K. Jain and R. C. Dubes, "Algorithms for Clustering Data", Prentice Hall, 1988. This formula shows that when i is tightly grouped with its peers in C, and at the meantime, is far away from points in other clusters, the point i will have a larger PSV value, which indicates that it is a stable point. In contrast, if other clusters attract i more than its own cluster, then i is an unstable point which is normally revealed by a low or even negative PSV value.

Step 3: Starting from the point i that has the lowest PSV value, this step first re-assigns that point to the cluster that least repulses it (module 805). Then re-calculation of the average intra-cluster distance over all clusters takes place as well as a comparison of the re-calculated distance with previously calculated one (modules 807 and 809). If a smaller value is observed, it means that the just-performed point adjustment is acceptable. Steps 1 and 2 are then repeated for additional point adjustment.

Step 4: If a larger average intra-cluster distance is encountered, the refinement process stops, and the last partition is returned as the final clustering result.

Mode-Based Data Clustering: Cluster Validity Analysis

To find the optimal number of clusters N for a given data distribution, multiple clustering passes are first run with each targeting at a different number of N. Then, a validity index is evaluated for each neighboring pass pair to determine if the partition generated in pass k+1 is better than that in pass k. For convenience, the cluster number in pass k may be denoted by $k_N$, which is initially set to be 1 and is linearly increased for each successive pass until no more passes are needed, or until it reaches an upper limit L.

FIG. 9 shows an exemplary implementation of the cluster validity analysis module (module 507 in FIG. 5). Three major steps involved in this process are described below:

Step 1: With the $k_N$ clusters generated from any pass k, the following measurements are computed from its partition (module 901):

The average intra-cluster distance (INCD), as defined in Step 1 of Section "Clustering Refinement and Stopping".

The three inter-cluster distances calculated from the original clusters, including the average minimum inter-cluster distance (MNID), the average median inter-cluster distance (MDID), and the average mean inter-cluster distance (MEID). The MNID is defined as the minimum of all distances between any pair of points across two clusters. Similarly, median and mean for the other two distances are calculated.

The three inter-MDPA distances calculated from clusters' most-densely-populated-areas (MDPA) in the sense of minimum, median and mean measurement. The MDPA of cluster C may be defined as the area that includes most of C's points and is highly compact. A comparison between the cluster and its MDPA can give clues about its compactness. These three distances are denoted by DMNID, DMDID and DMEID, and are calculated in similar ways as MNID, MDID and MEID.

Figure 10:
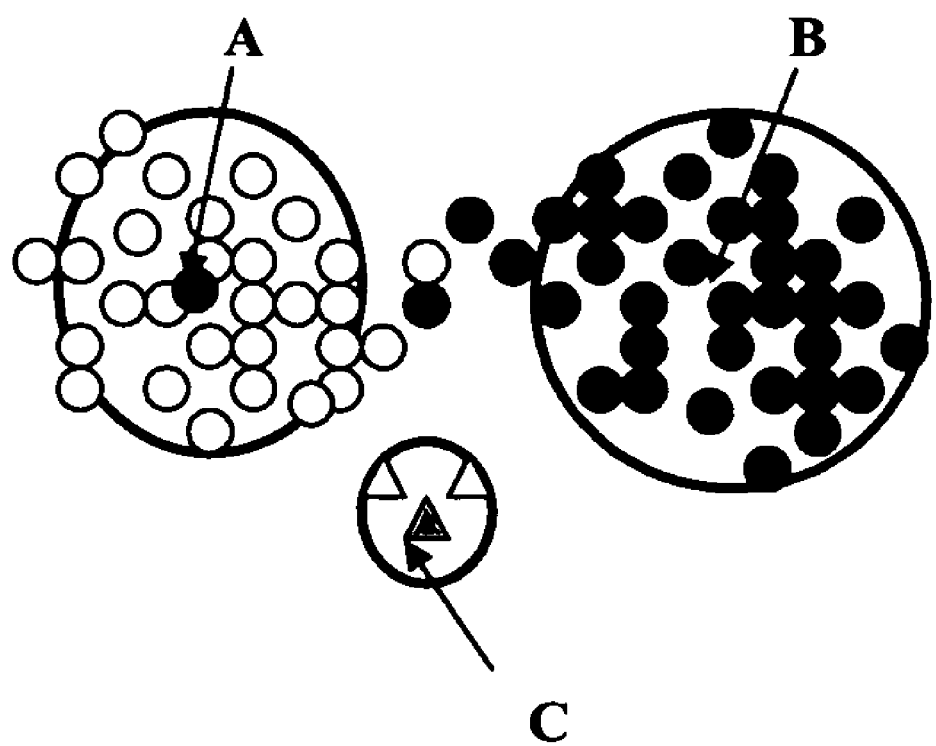
FIG. 10 illustrates an example of a clusters' most-densely-populated-areas (MDPA).

The MDPA of cluster C may be determined as follows. First, the MDPA is initialized to C, (i.e., select the cluster C as a whole to be a single most densely populated area) and its INCD distance is calculated. If the INCD is already small enough, then there is no need to continue as C is already compact enough. Otherwise, point i is searched, whose removal from MDPA significantly decreases the INCD distance. This rule may be applied by comparing the decrement from present to previous distance. Specifically, if the distance decrement rate increases after removing point i, i is indeed a "drifted" point; otherwise, it should be retained. This searching process may be repeated until no more points should be removed. Exemplary MDPA areas for clusters in FIG. 7 are shown in FIG. 10 as indicated by circles.

Step 2: Based on the measurements from Step 1, three additional functions are defined in this step: IR(k, k+1), BR(k, k+1) and DR(k, k+1). Specifically, IR(k, k+1) computes the ratio between intra-cluster distances evaluated in passes k and k+1, i.e. IR(k, k+1)=$INCD_k/INCD_{k+1}$. A good clustering process usually results in a small INCD. BR(k, k+1) equals the ratio between one particular inter-cluster distance computed in passes k and k+1. As there are three inter-cluster distances regarding the minimum, median and mean measurements, they are defined to be $BR_1(\ )$, $BR_2(\ )$ and $BR_3(\ )$, respectively. For example, $BR_1$(k, k+1)=$MNID_k/MNID_{k+1}$. Ideally, when pass k generates a better partition than pass k+1, $BR_i$(k, k+1) should be greater than 1.0. Finally, DR(k, k+1) is the ratio between the difference of corresponding inter-cluster and inter-MDPA distances computed in passes k and k+1. Three functions including $DR_1$(k, k+1), $DR_2$(k, k+1) and $DR_3$(k, k+1) are defined in this case in terms of the minimum, median and mean measurements. For example, $DR_1$(k, k+1)=$|MNID_k-DMNID_k|/|MNID_{k+1}-DMNID_{k+1}|$. A smaller DR value usually indicates a better partition which, in an ideal case, has smaller differences between clusters and their MDPA than those with larger DR values.

Step 3: This step computes the clustering validity index for each pair of neighboring passes as $$VI(k, k+1) = w_1 \times (1 - IR(k+1, k)) + w_2 \times \sum_{i=1}^{3} BR_i(k, k+1) + w_3 \times \sum_{i=1}^{3} [1 - DR_i(k, k+1)]$$

where $w_1$, $w_2$, and $w_3$ are three weighting coefficients which sum up to 1 and indicate the importance of each item (module 903). Specifically, the first term evaluates the cluster compactness, the second one evaluates the cluster separation, and the third one evaluates both. The weighting coefficients may be determined heuristically or set to be equal. Based on this analysis, when pass k generates a better partition than pass k+1, a large VI(k, k+1) is obtained. As a result, the validity analysis stops at pass k which gives the first local maximum index value, and consequently, $k_N$ is designated as the optimal number of clusters (module 905).

While the invention has been particularly shown and described with respect to illustrative and preformed embodiments thereof, it will be understood by those skilled, in the art that the foregoing and other changes in form and details may be made therein without departing from the spirit and scope of the invention which should be limited only by the scope of the appended claims.

What is claimed is:

1. A non-transitory computer readable medium embodying instructions executable by a processor to perform a method for content analysis comprising:
   receiving composite media content;
   identifying at least one speech segment based from the composite media content;
   tracking a speech flow pattern with a state transition machine through a plurality of speech segments of the composite media content;
   extracting scenes from the composite media content based on the state transitions in the speech flow pattern, wherein each scene comprises a plurality of speech segments; and
   classifying the scenes as one of discussion content or narration content according to the speech flow pattern;

dividing a plurality of narration-classified speech segments according to corresponding image content into a first set of homogeneous segments of the composite media content, wherein the first set of homogeneous segments each have homogeneous content; and dividing a plurality of discussion-classified speech segments according to feature space associations into a second set of homogeneous segments of the composite media content, wherein the second set of homogeneous segments each have homogeneous content.

2. The non-transitory computer readable medium of claim 1, wherein identifying the at least one speech segment further comprises:

comparing the speech segment with a statistical speech model of segments comprising a plurality of clusters of segments of speech segments;

refining the statistical model of segments based on the comparing step; and removing at least one of background noise and a linkage phrase from the speech segment.

3. The non-transitory computer readable medium of claim 2, wherein comparing the speech segment with the statistical speech model of segments further comprises:

measuring an acoustic dissimilarity between the statistical speech model and the speech segments; and detecting speaker change points in the composite media content.

4. The non-transitory computer readable medium of claim 1, further comprising:

creating a local color histogram of the narration-classified segments on a frame-by-frame basis;

comparing the image content for each pair of neighboring frames based on the local color histogram to detect content change information; and detecting boundaries between segments, wherein each segment contains frames of uniform content type using said content change information.

5. The non-transitory computer readable medium of claim 1, further comprising:

classifying at least one discussion-classified segment as one of a two-speaker discussion or a multi-speaker discussion.

6. The non-transitory computer readable medium of claim 5, further comprising:

representing the discussion-classified segment in line-spectrum pair feature space;

establishing proximities among said speech segments represented in the feature space by using a distance metric;

initializing the number of clusters to a number N;

determining N seeds to initiate a clustering based on the proximities and generating N clusters for said speech segments;

refining clusters of the N clusters of the said clustering based on the distance metrics;

increasing N by one until it reaches a bound L and repeating the initial cluster formation and the refinement process for each increment of N;

performing a cluster validity analysis on said L clusters;

selecting at least one cluster satisfying a validation criteria; and determining a discussion type based on the number of clusters in the selected clustering.

7. The non-transitory computer readable medium of claim 6, wherein determining the N seeds comprises:

removing outlier points from a set of points representing speech segments; and applying a joint-mode and distance-based seed initialization process to points remaining after outlier removal to obtain the set of seeds.

8. The non-transitory computer readable medium of claim 6, wherein refining the clusters comprises:

computing an initial average intra cluster distance for the said cluster;

computing a point stability value for each point in the cluster;

selecting the point having the lowest stability value and reassigning it to another cluster in the cluster that attracts that point the most;

recalculating the average intra-cluster distance for the said cluster;

generating a refined cluster if the recalculated distance is less than the initial computed distance; and repeating the entire process including the point stability value calculation, point reassignment, and intra-cluster distance recalculation and comparison, until the recalculated intra-cluster distance is larger than its previous value.

9. The non-transitory computer readable medium of claim 6, wherein performing the cluster validity analysis comprises:

performing a plurality of clustering passes;

computing an intra-cluster distance and a set of inter-cluster distances based on both the clusters and clusters' most-densely-populated-areas for each pass;

computing a validity index based on the intra-cluster and inter-cluster distances; and identifying an optimal clustering pass as the clustering pass that corresponds to a local maximum in a curve based on the validity index.

* * * * *